(12) United States Patent
Lai et al.

(10) Patent No.: US 10,956,338 B2
(45) Date of Patent: Mar. 23, 2021

(54) LOW LATENCY DIRTY RAM FOR CACHE INVALIDATION SPEED IMPROVEMENT

(71) Applicant: ATI Technologies ULC, Markham (CA)

(72) Inventors: Leon King Nok Lai, Markham (CA); Qian Ma, Markham (CA); Jimshed B. Mirza, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

(21) Appl. No.: 16/195,435

(22) Filed: Nov. 19, 2018

(65) Prior Publication Data

US 2020/0159664 A1 May 21, 2020

(51) Int. Cl.
*G06F 12/0891* (2016.01)
*G06F 3/06* (2006.01)

(52) U.S. Cl.
CPC ........ *G06F 12/0891* (2013.01); *G06F 3/0604* (2013.01); *G06F 3/0659* (2013.01); *G06F 3/0679* (2013.01); *G06F 2212/221* (2013.01)

(58) Field of Classification Search
CPC .................................................. G06F 12/0891
See application file for complete search history.

(56) References Cited

U.S. PATENT DOCUMENTS

| | | | | |
|---|---|---|---|---|
| 2006/0156155 A1* | 7/2006 | Gurumurthi | ........ | G06F 11/0793 714/746 |
| 2006/0184745 A1* | 8/2006 | Tan | ..................... | G06F 12/0804 711/143 |
| 2007/0226425 A1* | 9/2007 | Caprioli | .............. | G06F 12/0804 711/143 |
| 2014/0208035 A1* | 7/2014 | Novakovsky | ....... | G06F 12/0842 711/130 |
| 2017/0010655 A1* | 1/2017 | Kanchana | ............. | G06F 1/3275 |
| 2018/0285105 A1* | 10/2018 | Wang | .................... | G06F 9/3004 |
| 2019/0196974 A1* | 6/2019 | Kalyanasundharam | ..................... | G06F 12/0897 |
| 2019/0205253 A1* | 7/2019 | Roberts | ................. | G06F 12/121 |

* cited by examiner

*Primary Examiner* — Edward J Dudek, Jr.
(74) *Attorney, Agent, or Firm* — Volpe Koenig

(57) ABSTRACT

A technique for improving performance of a cache is provided. The technique involves maintaining indicators of whether cache entries are dirty in a random access memory ("RAM") that has a lower latency to a cache controller than the cache memory that stores the cache entries. When a request to invalidate one or more cache entries is received by the cache controller, the cache controller checks the RAM to determine whether any cache entries are dirty and thus should be written out to a backing store. Using the RAM removes the need to check the actual cache memory for whether cache entries are dirty, which reduces the latency associated with performing such checks and thus with performing cache invalidations.

20 Claims, 5 Drawing Sheets

US 10,956,338 B2

LOW LATENCY DIRTY RAM FOR CACHE INVALIDATION SPEED IMPROVEMENT

BACKGROUND

Cache memories are used in a wide variety of locations in computing devices. These memories aim to improve memory access speed by providing local copies of data likely to be used in the future. Because of their ubiquity, improvements to cache memories are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for improving performance of a cache is provided. The technique involves maintaining indicators of whether cache entries are dirty in a random access memory ("RAM") that has a lower latency to a cache controller than the cache memory that stores the cache entries. When a request to invalidate one or more cache entries is received by the cache controller, the cache controller checks the RAM to determine whether any cache entries are dirty and thus should be written out to a backing store. Using the RAM removes the need to check the actual cache memory for whether cache entries are dirty, which reduces the latency associated with performing such checks and thus with performing cache invalidations.

Figure 1:
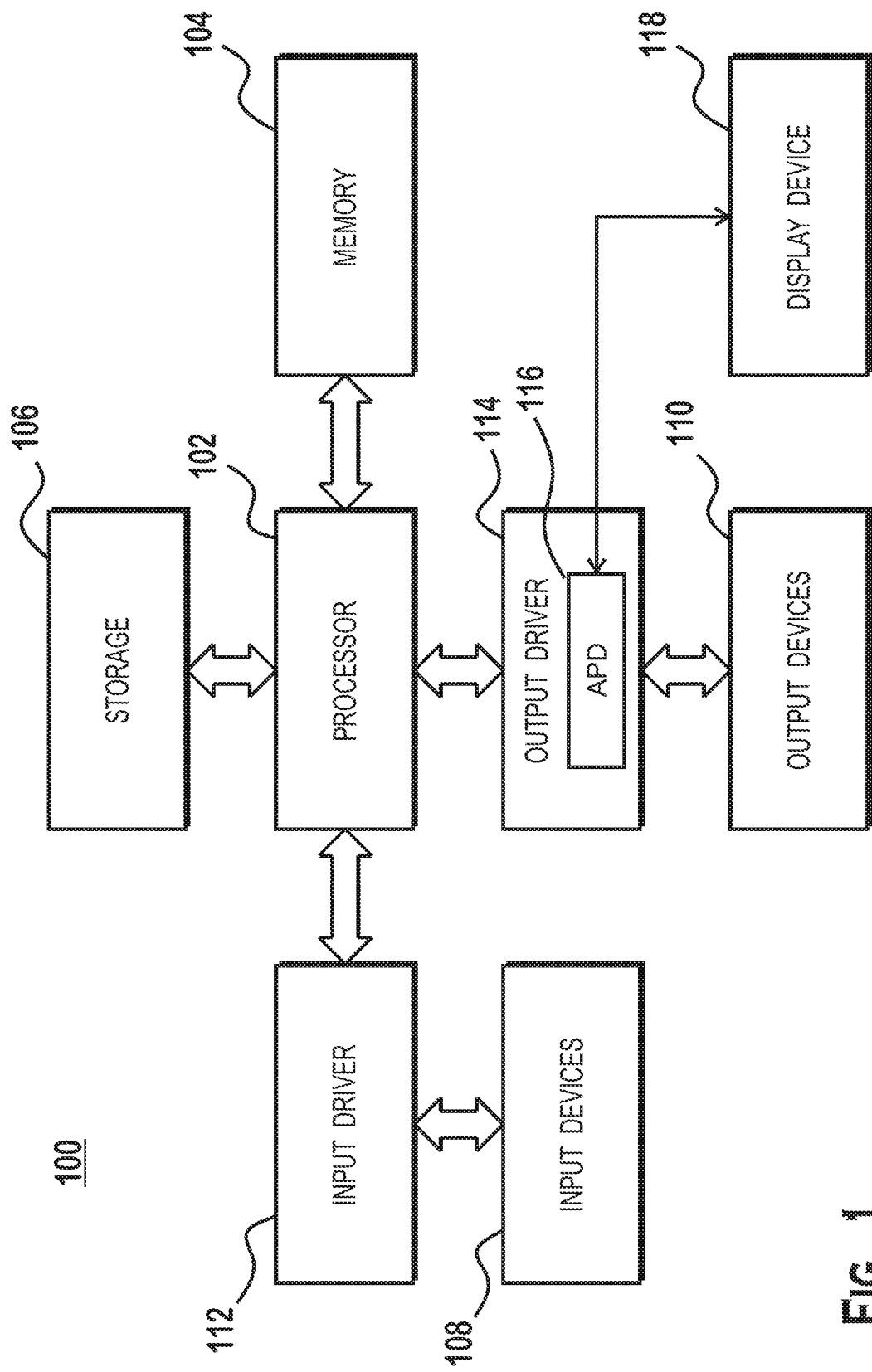
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118.

Figure 2:
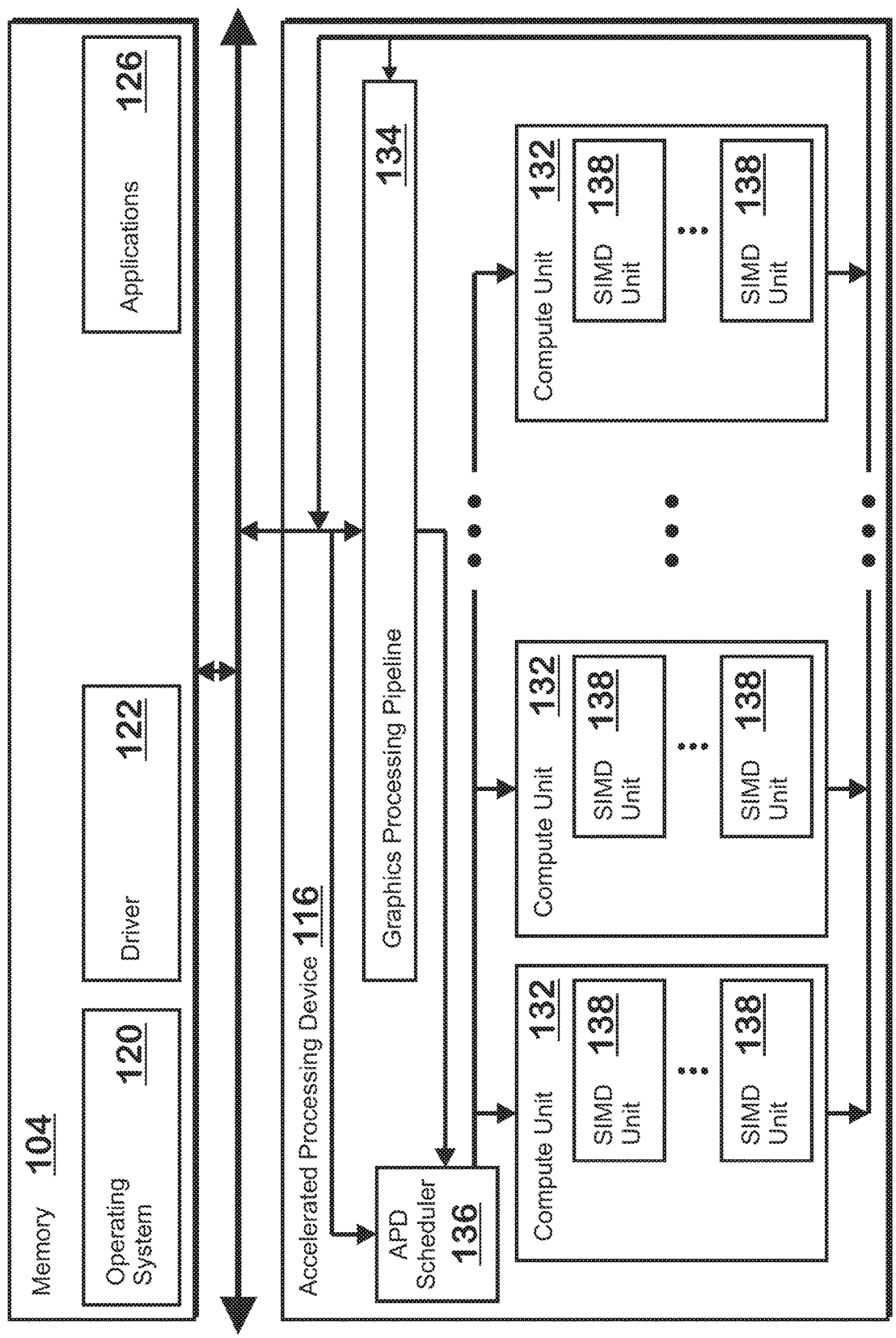
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
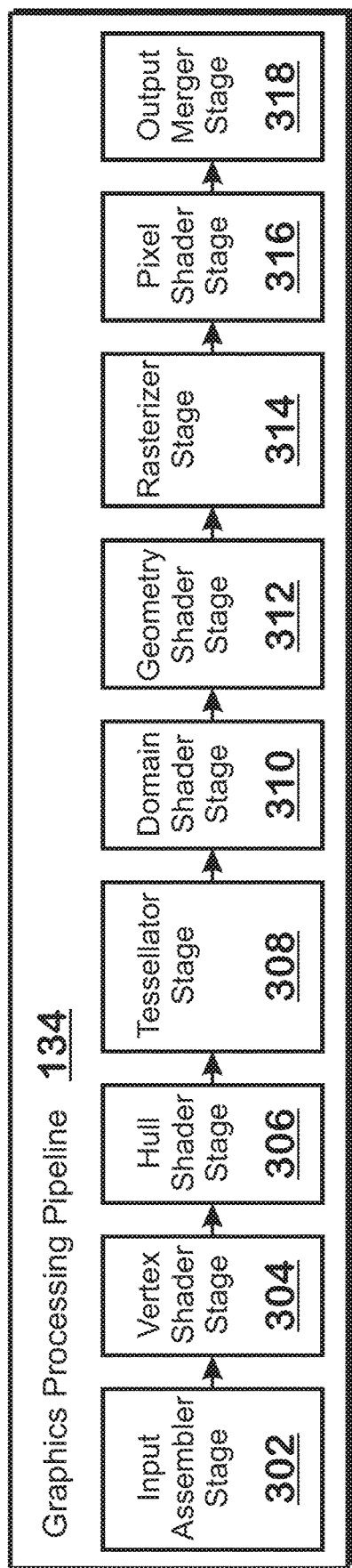
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Figure 4:
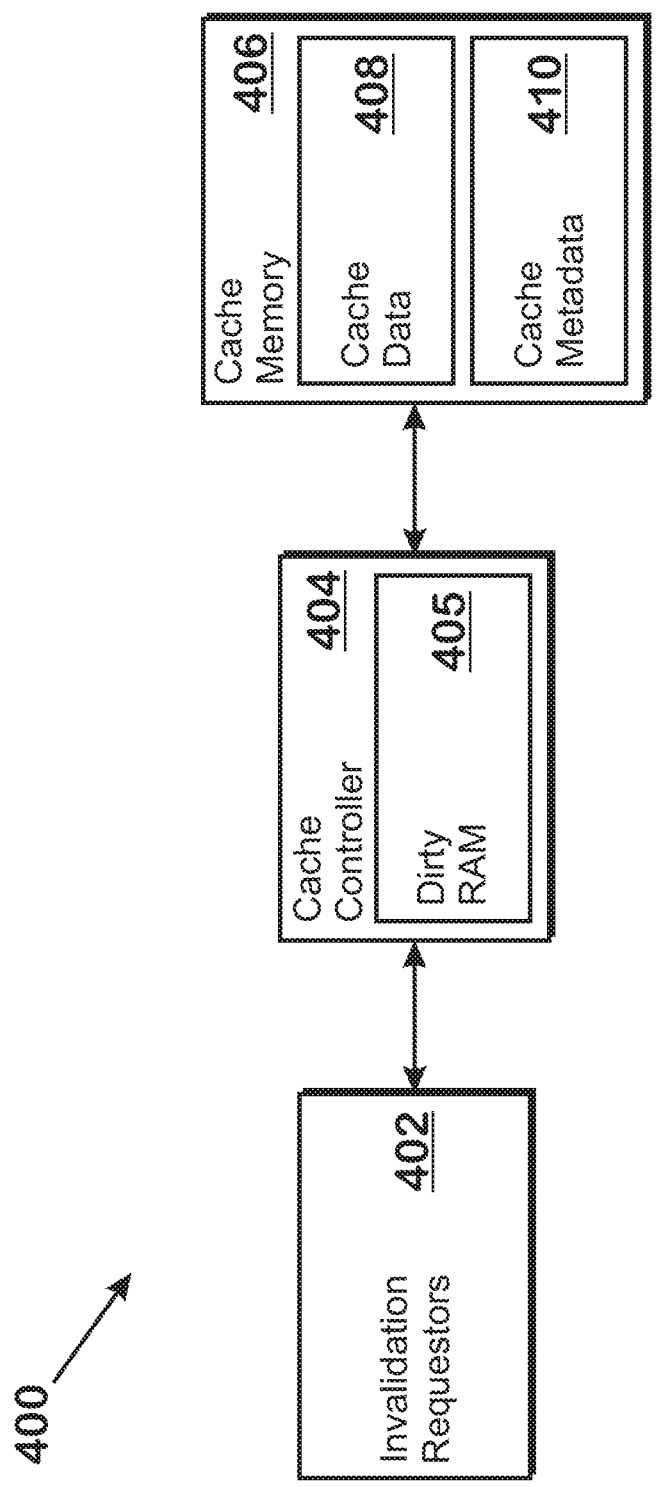
FIG. 4 is a block diagram of a cache memory system, including a cache controller having a dirty RAM, coupled to a high latency cache memory, according to an example.

Referring back to FIG. 2, various components of the APD 116 may access a high latency cache memory (which corresponds to the cache memory 406 of FIG. 4). The high latency cache memory may be located at any location, including within the APD 116 or outside of the APD 116. In some examples, at least a portion of the APD 116 is embodied in a single computer chip and the high latency memory is external to (but coupled to) that chip. In some examples, the high latency memory is on a printed circuit board along with, but external to, the APD 116. In other examples, the high latency memory is within the APD 116, but at least some of the units that access the high latency memory do so with a high latency. Herein, the term "high latency" means that the number of cycles that communication with the high latency cache takes is greater than the number of cycles that communication with a low latency cache takes.

Sometimes, a unit of the APD 116 requests (possibly at the request of the processor 102 or another entity) that entries of the high latency cache be invalidated. These requests may be part of flush requests, which are requests to invalidate ranges of memory, or may comprise individual invalidation requests to invalidate individual cache lines. A cache invalidation involves marking specified cache entries as being invalid. If the entries to be made invalid include dirty data, then the invalidation must also cause the dirty data to be written out to a backing memory (such as memory 104 or a memory of the APD 116). Data is dirty if the copy of the data in the cache is different than that in a backing store (such as a higher level cache or system memory).

A cache controller is a hardware circuitry unit that controls access to a cache memory. More specifically, the cache controller performs functions such as receiving requests to access the cache, identifying whether the cache stores the requested entries, determining which set and way cache entries are in, accessing those entries via the set and way, and controlling other operations such as cache evictions, cache write-ins (bringing cache entries from a higher level cache or system memory into the cache), and other functions. As used herein, the term "cache line" is synonymous with "cache entry." A cache line comprises the smallest unit at which data is written into a cache memory.

When performing invalidation operations, in order to determine whether to write out cache entries, a cache controller examines metadata. If the metadata indicates that an entry is dirty, then the cache controller causes that data to be written out to memory. If the metadata indicates that any entry is not dirty, then the cache controller marks the data as invalid without causing the data to be written to memory. With a high latency cache, the act of reading the metadata to determine whether a cache entry is dirty consumes a large number of clock cycles.

For this reason, a cache controller is disclosed herein that includes a dirty random access memory ("dirty RAM") which stores data indicating whether entries of the high latency cache memory are dirty or not dirty. FIG. 4 is a block diagram of a cache memory system 400, including a cache controller 404 having a dirty RAM 405, coupled to a high latency cache memory 406, according to an example. In various implementations, the cache memory system 400 is a part of the APD 116. Invalidation requestors 402 are also illustrated as being in communication with the cache controller 404. The invalidation requestors 402 include one or more units configured to send requests to the cache controller 404 to invalidate one or more entries of the cache memory 406. One example of an invalidation requestor is a command processor, which is part of the APD 116, and which may be the same unit, or be a part of, the scheduler 136. The command processor receives commands generated external to the APD 116 (such as by an application 126 executing in the processor 102), and converts those commands to other commands in a format suitable for execution by the APD 116. In an example, the processor 102 sends commands to invalidate certain cache entries stored in the cache memory 406 to the command processor. The command processor converts those commands into commands recognizable by the cache controller 404, which then invalidates the data specified by the commands.

The cache memory 406 includes cache data 408 and cache metadata 410. The cache data 408 is whatever data is placed into the cache memory 406 by virtue of units that utilize the cache memory 406 accessing that data. In examples, the cache data 408 includes cache lines, which are units of data that can be written into or read out of the cache memory 406. The cache metadata 410 stores metadata related to the cache data 408. In an example, the cache metadata 410 includes, on a per cache line basis, the following metadata: the memory address associated with the cache line; and multiple status bits that include a dirty bit, a valid bit, a cache line type, and/or any other status bits. In some implementations, each cache line includes multiple sectors, and the cache metadata 410 includes status bits for each sector.

The cache memory 406 may have high latency as compared with other cache memories. Thus, the cache controller 404 checking the cache metadata 410 in the cache memory 406 before determining whether cache entries for which invalidation has been requested are to be written out to a backing store takes a relatively long amount of time. To reduce the amount of time to be used for identifying whether particular cache entries are to be written out to a backing store, the cache controller 404 includes a dirty RAM 405, which stores copies of the information indicating which cache lines in the cache memory 406 are dirty, but not any of the other status information of the cache metadata 410. In implementations where the cache metadata 410 includes a dirty bit for each sector of a cache line, the dirty RAM 405 stores one dirty bit for each cache line that indicates whether any of the sectors of the cache line are dirty. Instead of examining the cache metadata 410 in the cache memory 406, the cache controller 404 examines the dirty RAM 405 to determine whether to write out entries of the cache memory 406. Then, for whichever entries are indicated as dirty, the cache controller 404 causes those entries to be written out to a backing store and invalidates those entries in the cache memory 406.

The cache controller 404 maintains the dirty RAM 405, updating the data in the dirty RAM 405 to indicates whether entries in the cache memory 406 are dirty or not dirty. When the cache controller 404 causes a new cache entry to be placed into the cache memory 406, the cache controller 404 stores corresponding data for that entry in the dirty RAM 405, with an indication that the entry in the cache memory 406 is not dirty. When the cache controller 404 causes an entry in the cache memory 406 to be written to, the cache controller 404 also updates the data in the dirty RAM 405 corresponding to that entry to indicate that the entry is dirty. When an entry is no longer resident (or invalid) in the cache memory 406, the corresponding entry in the dirty RAM 405 is also made no longer resident (or invalid). In an example, a cache entry is invalidated and the corresponding entry in the dirty RAM 405 is also invalidated.

Figure 5:
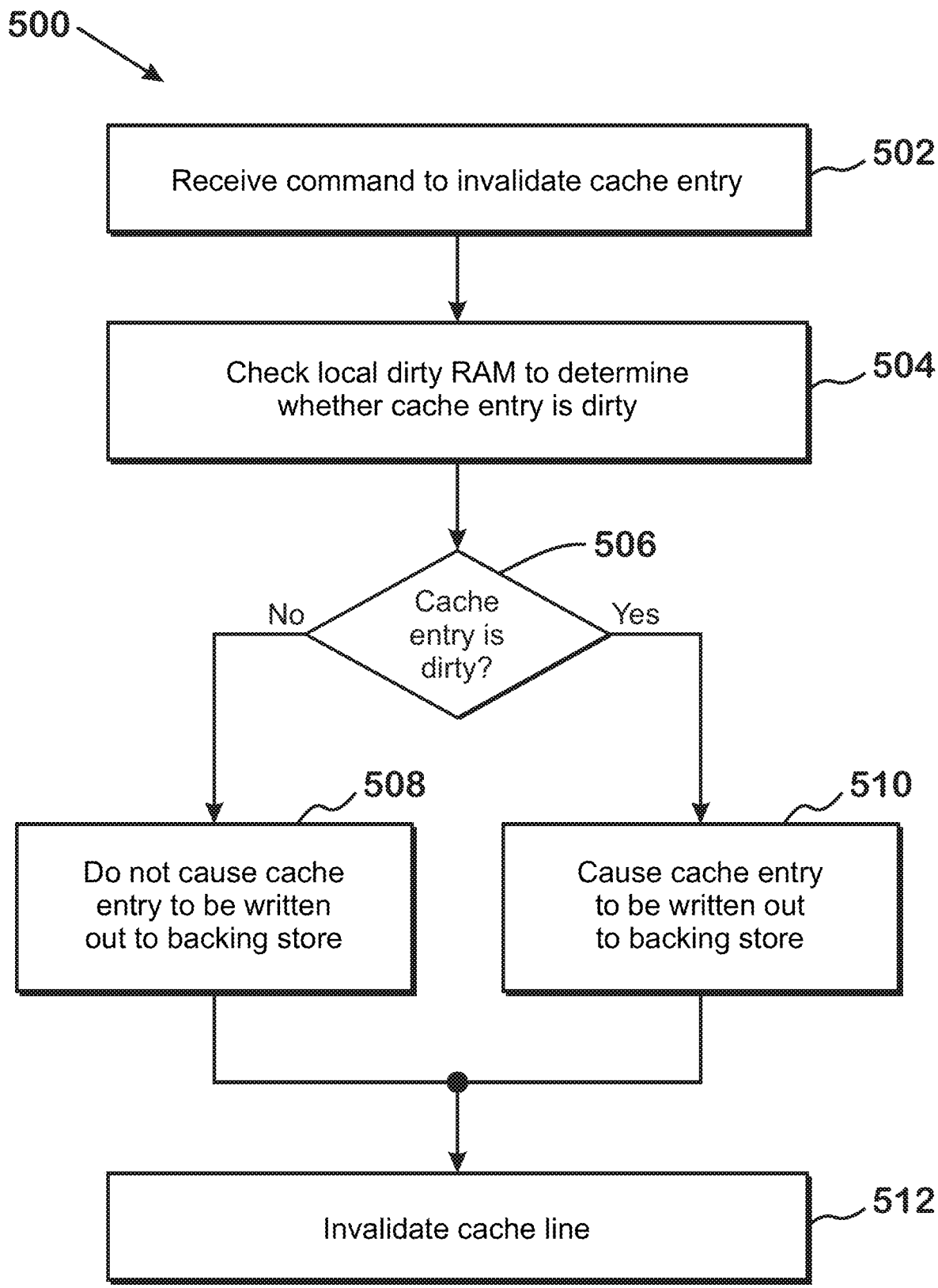
FIG. 5 is a flow diagram of a method 500 for invalidating entries of a cache, according to an example.

FIG. 5 is a flow diagram of a method 500 for invalidating entries of a cache, according to an example. Although described with respect to the system of FIGS. 1-4, any system, configured to perform the steps of method 500 in any technically feasible order, falls under the scope of the present disclosure.

The method 500 begins at step 502, where the cache controller 404 receives a command to invalidate a cache entry. These commands come from an invalidation requestor 402, which can be a command processor or an APD 116 or another entity that requests invalidation of cache entries. At step 504, the cache controller 404 examines a local dirty RAM (random access memory) 405 that stores indications of whether cache entries (i.e., the cache data 408) of a cache memory 406 are dirty. The local dirty RAM 405 is local to the cache controller 404. Here, "local" means accessing the dirty RAM 405 by the cache controller 404 has lower latency (requires fewer clock cycles) than accessing the cache metadata 410 of the cache memory 406. In some implementations, the local dirty RAM 405 is within the cache controller 404. In other implementations, the local dirty RAM 405 is external to the cache controller 404.

At step 506, the cache controller 404 determines whether the dirty RAM 405 indicates that the cache entry requested to be invalidated is dirty or not. If the cache entry is dirty, then the method proceeds to step 510 and if the cache entry is not dirty, then the method proceeds to step 508. At step 510, because the cache line is dirty, the cache controller 404 causes the cache entry to be written out to a backing store (such as a higher level cache or system memory). To write the data back to the backing store, the cache controller 404 examines the cache metadata 410 to obtain the memory address for the data. Then, the cache controller 404 causes the data to be written to the obtained memory address. At step 508, because the cache line is dirty, the cache controller 404 does not cause the cache entry to be written out to a backing store. After either step 508 or 510, the method 500 proceeds to step 512, where the cache controller 404 causes the cache line to be invalidated.

The techniques provided herein provide the benefit that the cache controller 404 does not need to read metadata (such as cache metadata 410) in a high latency manner when invalidating cache entries. In some possible implementations, when a cache controller for a high latency cache is to invalidate cache entries, the cache controller would first read cache metadata stored in the same cache memory that stores the cache entries to determine whether the cache entries are dirty, and then would either write-out or not write-out those entries to a backing store depending on the metadata. Because the cache is high latency (meaning that accessing the cache by the cache controller takes a relatively large number of cycles—more cycles, for example, than other caches that the cache controller or another cache controller in an APD would take to access different caches), the first access to read the metadata is a slow operation. Addition of the dirty RAM speeds up this metadata lookup operation. In some situations, the cache controller is provided with a command to flush an entire high latency cache memory or an entire portion of a high latency cache memory, which spans multiple cache entries. In such situations, the cache controller would have to perform multiple read operations on the high latency cache in order to read the metadata for each of the entries that is to be invalidated. Maintaining the dirty RAM 405 reduces the amount of time necessary to perform invalidations.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for invalidating cache entries of a cache, the method comprising:

receiving a command to invalidate a cache entry of a cache memory, wherein the cache memory is configured to store a first plurality of dirty bits including a dirty bit for the cache entry, wherein the first plurality of dirty bits includes not more than one dirty bit per cache line of the cache memory;

examining, by a cache controller, a dirty random access memory ("dirty RAM") entry to determine whether the cache entry is dirty, wherein the dirty RAM is configured to store a second plurality of dirty bits including a copy of the dirty bit for the cache entry, wherein the second plurality of dirty bits includes not more than one dirty bit per cache line of the cache memory; and either writing back or not writing back the cache entry to a backing store based on the dirty RAM entry, wherein accessing the dirty RAM by the cache controller is a lower latency operation than accessing the cache memory.

2. The method of claim 1, wherein:
the dirty RAM indicates that the cache entry is dirty; and
the method includes writing back the cache entry to the backing store.

3. The method of claim 1, wherein:
the dirty RAM indicates that the cache entry is not dirty; and the method includes not writing back the cache entry to the backing store in the course of invalidating the cache entry.

4. The method of claim 1, wherein the dirty RAM is included within the cache controller.

5. The method of claim 1, wherein:
the cache memory stores cache metadata that includes dirty data; and
the dirty RAM does not include at least some of the metadata included in the cache metadata.

6. The method of claim 1, wherein the cache memory and cache controller are included within an accelerated processing device.

7. The method of claim 1, wherein:
the command to invalidate the cache entry comprises a command to invalidate a range of memory addresses that corresponds to multiple cache entries;
examining the dirty RAM further includes determining whether each of the multiple cache entries is dirty; and
the method further includes either writing back or not writing back each of the multiple cache entries based on the dirty RAM.

8. The method of claim 1, wherein:
accessing the dirty RAM by the cache controller having a lower latency than accessing the cache memory means that accessing the dirty RAM by the cache controller takes fewer clock cycles than accessing the cache memory by the cache controller.

9. The method of claim 1, wherein the cache memory stores a plurality of cache entries, each entry comprising a cache line defined by a way and a set.

10. A cache system for invalidating cache entries of a cache, the cache system comprising:
a cache memory; and
a cache controller configured to:
receive a command to invalidate a cache entry of the cache memory, wherein the cache memory is configured to store a first plurality of dirty bits for the cache entry, wherein the first plurality of dirty bits includes not more than one dirty bit per cache line of the cache memory;
examine a dirty random access memory ("dirty RAM") entry to determine whether the cache entry is dirty, wherein the dirty RAM is configured to store a second plurality of dirty bits including a copy of the dirty bit for the cache entry, wherein the second plurality of dirty bits includes not more than one dirty bit per cache line of the cache memory; and
either write back or not write back the cache entry to a backing store based on the dirty RAM entry,
wherein accessing the dirty RAM by the cache controller is a lower latency operation than accessing the cache memory.

11. The cache system of claim 10, wherein:
the dirty RAM indicates that the cache entry is dirty; and
the cache controller is further configured to write back the cache entry to the backing store.

12. The cache system of claim 10, wherein:
the dirty RAM indicates that the cache entry is not dirty; and
the cache controller is further configured to not write back the cache entry to the backing store in the course of invalidating the cache entry.

13. The cache system of claim 10, wherein the dirty RAM is included within the cache controller.

14. The cache system of claim 10, wherein:
the cache memory stores cache metadata that includes dirty data; and
the dirty RAM does not include at least some of the metadata included in the cache metadata.

15. The cache system of claim 10, wherein the cache memory and cache controller are included within an accelerated processing device.

16. The cache system of claim 10, wherein:
the command to invalidate the cache entry comprises a command to invalidate a range of memory addresses that corresponds to multiple cache entries;
examining the dirty RAM further includes determining whether each of the multiple cache entries is dirty; and
the cache controller is further configured to either write back or not write back each of the multiple cache entries based on the dirty RAM.

17. The cache system of claim 10, wherein:
accessing the dirty RAM by the cache controller having a lower latency than accessing the cache memory means that accessing the dirty RAM by the cache controller takes fewer clock cycles than accessing the cache memory by the cache controller.

18. The cache system of claim 10, wherein the cache memory stores a plurality of cache entries, each entry comprising a cache line defined by a way and a set.

19. An computing device for invalidating cache entries of a cache, the APD comprising:
an invalidation requestor;
a cache memory; and
a cache controller configured to:
receive a command to invalidate a cache entry of the cache memory from the invalidation requestor, wherein the cache memory is configured to store a first plurality of dirty bits for the cache entry, wherein the first plurality of dirty bits includes not more than one dirty bit per cache line of the cache memory;
examine a dirty random access memory ("dirty RAM") entry to determine whether the cache entry is dirty, wherein the dirty RAM is configured to store a second plurality of dirty bits including a copy of the dirty bit for the cache entry, wherein the second plurality of dirty bits includes not more than one dirty bit per cache line of the cache memory; and
either write back or not write back the cache entry to a backing store based on the dirty RAM entry,
wherein accessing the dirty RAM by the cache controller is a lower latency operation than accessing the cache memory.

20. The computing device of claim 19, wherein the dirty RAM is included within the cache controller.

* * * * *